June 2, 1931.  W. A. AHERN  1,807,951

WATER HEATER

Filed Nov. 21, 1928

William Albert Ahern
INVENTOR

Patented June 2, 1931

1,807,951

UNITED STATES PATENT OFFICE

WILLIAM ALBERT AHERN, OF WORCESTER, MASSACHUSETTS

WATER HEATER

Application filed November 21, 1928. Serial No. 320,882.

This invention relates to water heaters especially adapted for household use, an object being to provide means for heating a maximum amount of water within a relatively short time and at a relatively small expense.

Another object of the invention is the provision of a water heater which may be readily taken apart and reassembled for cleaning or repair.

With the above and other objects in view, the invention further includes the following novel features and details of construction, to be hereinafter more fully described, illustrated in the accompanying drawings and pointed out in the appended claims.

In the drawings:—

Figure 1:
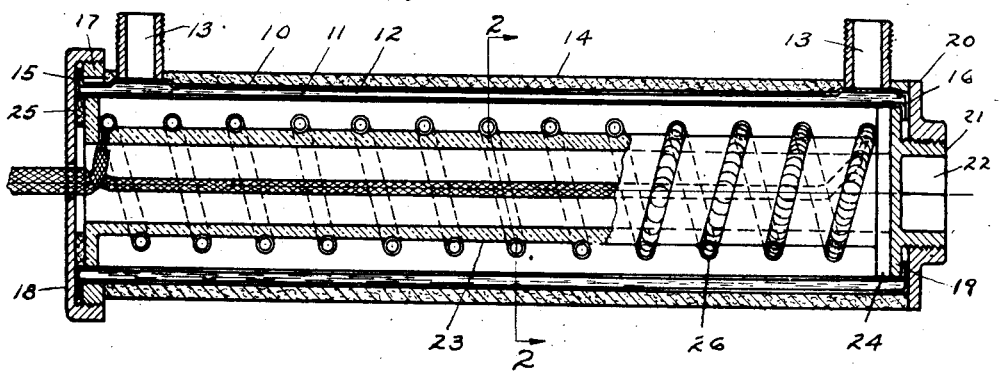
Figure 1 is a longitudinal sectional view through a heater constructed in accordance with the invention.
Figure 2:
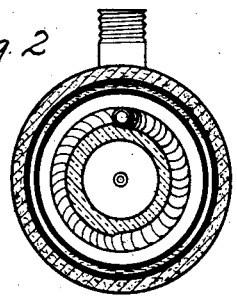
Figure 2 is a section on the line 2—2 of Figure 1.

Referring to the drawings in detail wherein like characters of reference denote corresponding parts, the heater shown in Figures 1 and 2 is constructed of an outer shell 10 and an inner shell 11, these shells being of relatively thin metal. The shells are spaced relatively close so as to provide a thin annular water chamber 12 having water inlets and outlets 13 at opposite ends. The outer shell 10 is covered with suitable heat insulating material 14 so as to prevent the escape of heat.

The shells 10 and 11 are provided at their ends with rightangularly arranged flanges 15 and 16, the flanges 15 extending circumferentially outward while the flanges 16 extend circumferentially inward.

Mounted upon the outer shell 10 at one end thereof and bearing against the flange 15 of said shell is a collar 17 which is externally threaded to engage internal threads provided upon a flanged cap 18 which bears against the flange 15 of the inner shell. The flanges 15 are thus clamped between this cap and the collar 17 so as to effectually close this end of the water chamber 12.

A disk or bushing 19 is positioned within the inner shell and bears against the flange 16 of this shell, while a disk or cap 20 bears against the flange 16 of the outer shell. In order to provide a clamping engagement between the bushing or disk 19 and the cap or disk 20, the bushing is provided with an externally threaded boss 21 which engages the internally threaded walls of an opening provided in the cap 20. The boss 21 is provided with a squared wrench receiving socket 22.

Heat may be supplied by either oil gas or electric current and where the latter is used, the inner shell encloses an insulated core 23 whose opposite ends are flanged as shown at 24. One of these flanges bears against the bushing 19 while bearing against the other flange of the core is a compressible packing 25. Thus, the clamping means which clamps the flanges 15 and 16 together to close the ends of the water chamber 12 also serves to securely hold the insulated core 23 in position. The core 23 carries an electric heating element 26 which may be arranged within a spiral groove 27 provided in the outer surface of the core.

Figure 4:
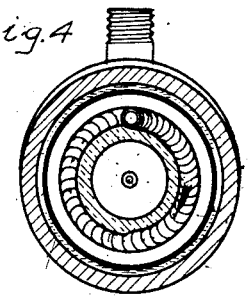
Figure 4 is a section on the line 4—4 of Figure 3.
Figure 3:
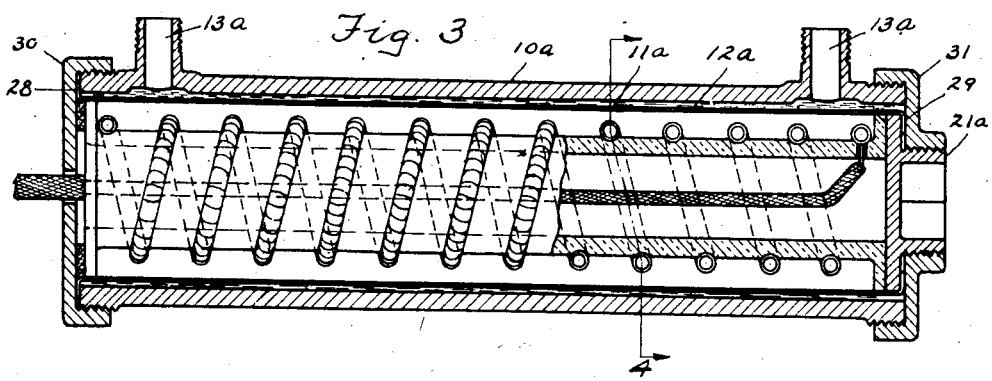
Figure 3 is a view similar to Figure 1 showing a slightly different construction of heater.

In Figures 3 and 4 of the drawings, the outer shell 10a is relatively thick while the inner shell 11a is thin. This inner shell is provided with a flange 28 at one end and a flange 29 at its opposite end. The flange 28 is clamped between the end of the shell 10a and a threaded cap 30, while the flange 29 is clamped between the threaded bushing 21a and a threaded cap 31. The space between the shells 10a and 11a forms a relatively thin water chamber 12a having inlets and outlets 13a.

In other respects, the construction of the heater is the same as that described in connection with Figures 1 and 2.

The invention is susceptible of various changes in its form, proportions and minor details of construction and the right is herein reserved to make such changes as properly fall within the scope of the appended claims.

Having described the invention what is claimed is:

1. In a water heater, an outer shell, an inner shell spaced therefrom and defining a thin annular water chamber, the shells being provided at their ends with right angularly disposed flanges extending circumferentially inward at one end and circumferentially outward at the other end to permit assembly of the shells one within the other with their flanges in contact, means coöperating with the flanges at each end of the chamber to clamp the flanges together by pressure applied on opposite sides of each pair of flanges and an insulated cylindrical core carrying an electrical heating element insertible within the inner shell and held in position by said flange clamping means.

2. In a water heater, an outer shell, an inner shell spaced therefrom and defining a thin annular water chamber, the shells being provided at their ends with right angularly disposed flanges extending circumferentially inward at one end and circumferentially outward at the other end, to permit assembly of the shells one within the other with their flanges in contact, a bushing insertible within an inner shell providing a flange engageable with the shell flanges at one end of said heater, a nut in threaded engagement with a bore on said bushing to clamp the engaged shell flanges together, an externally threaded collar receivable over the outer shell for engaging the flanges at the other end of the heater and a flanged cap threaded on said collar to clamp the outwardly extending shell flanges between said collar and said cap.

In testimony whereof I affix my signature.

WILLIAM ALBERT AHERN.